April 21, 1953  J. J. SKELLY  2,635,319
BAND CLAMP
Filed Sept. 8, 1951
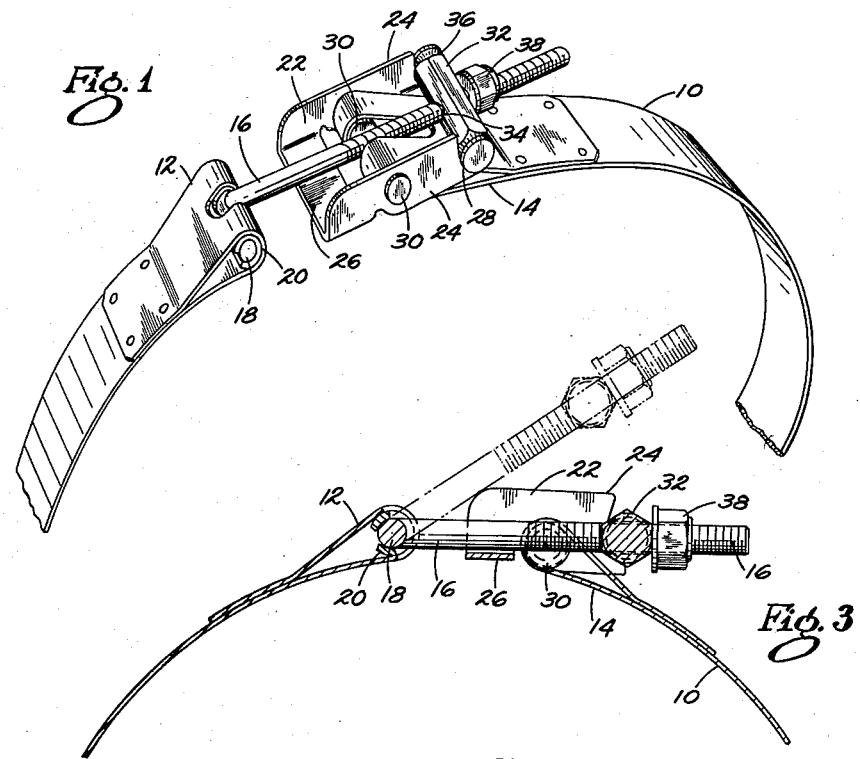
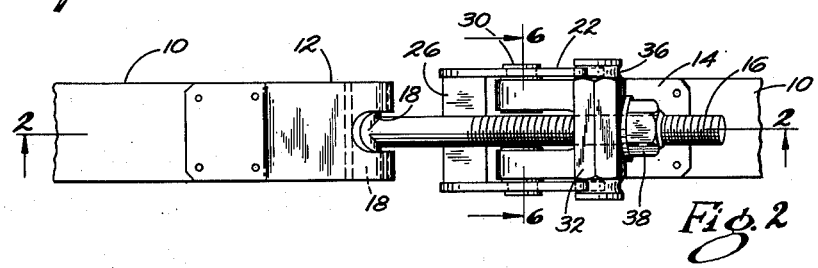
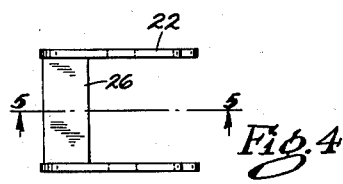
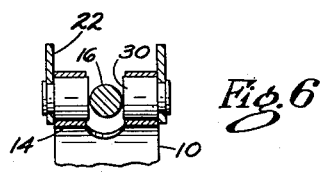
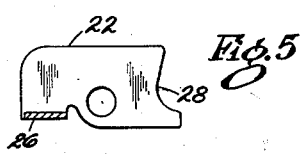
INVENTOR.
JAMES J. SKELLY
BY Richy T Watts
ATTORNEYS Patented Apr. 21, 1953

2,635,319

UNITED STATES PATENT OFFICE 2,635,319

BAND CLAMP

James J. Skelly, Lakewood, Ohio, assignor of one-half to Fenton M. Davison, Cleveland, Ohio Application September 8, 1951, Serial No. 245,717

1 Claim. (Cl. 24—279)

This invention relates to band clamps and in particular to clamps for securing a hose connection with necessary tension to prevent leaks under high pressures, that are rust- and weatherproof and are particularly adapted for installation on aircraft engines since they can be safely used without danger of failure or becoming unlocked under vibration conditions.

The most important object of this invention is to provide a clamp which has mechanism for quick release of the clamp whenever it is desired to remove the clamp for separating the cylindrical elements, such removal being accomplished without disassembly of the parts.

The primary object of this invention is to provide a clamp having a simple construction and sufficient strength to make the use thereof reliable under all conditions.

Another object of this invention is to provide a clamp having a lock which renders the assembly thereof easy and foolproof without complicated parts.

Another object of this invention is to provide a quick-release lock which is capable of adjustment for bringing the clamp into tightened relationship with the object to be clamped and to be permanently latched in the clamping position.

These and other objects and features of the invention will be more readily apparent from a consideration of the following detailed specification and appended claim taken in connection with the accompanying drawings, in which:

Fig. 1 is a perspective view of the band clamp in locked position;

Fig. 2 is a top view of the band clamp;

Fig. 3 is a sectional view taken along line 2—2 in Fig. 2 showing the unlatched position of the lock;

Fig. 4 is a detail view of the latch;

Fig. 5 is a cross-sectional view of the latch taken along the line 5—5 in Fig. 4; and Fig. 6 is a cross-sectional view of the lock taken along the line 6—6 in Fig. 2.

Referring first to Fig. 1, the numeral 10 designates a band of thin flexible material for engaging the circumference of a pair of cylindrical objects to be clamped together. The band 10 has a bifurcated loop 12 formed at one end thereof by rebending a portion of the band 10 upon its end and fixing it thereto by spot welding or other method. A second bifurcated loop 14 is formed on the opposite end of the band 10 from loop 12 in a similar manner to that of loop 12. A T-head bolt 16, having a cross member 18, is disposed in engagement with the loop 12 in such a manner that the threaded portion of the bolt projects along the extended centerline of the band 10. A sleeve 20 lies intermediate the member 18 and the loop 12.

A channel-shaped latch 22 has parallel side portions 24 joined together by a bottom portion 26 adjacent one end thereof. An arcuate wall 28 is formed on the end of each side 24, respectively, of the latch 22. The wall 28 has a shallow U-shape with overhanging portions both above and below the centerline of the sides 24. A pair of pintles 30 projects inwardly from the sides 24 at substantially the center thereof and are affixed to the latch 22 by riveting or welding. The pintles 30 engage the loop 14 and rotatably join the latch 22 thereto. The space between the ends of the pintles corresponds to the slotted section of the loop 14 and provides an opening through which the bolt 16 moves during the latching process.

A cross bar 32, having a length slightly longer than the width of the latch 22, has a bore 34 for slidably receiving the bolt 16. A pair of annular grooves 36 is formed on the bar adjacent the ends thereof and registers with the arcuate walls 28 when the bar 32 and the latch are in locking position. A nut 38 threadably mounted on the bolt 16 engages the bar 32 to apply tension through the latch 22 to the strap 10, as the nut 38 is tightened along the bolt 16.

When the strap 10 is placed in operating position in clamping relationship with the work to be held, the nut 38 is loosened and the bolt 16 is rotated into position for bringing the bar 32 into register with the arcuate ends 28 of the latch 22. The nut 38 is then rotated to apply tension to the band 10. As the compressive stress is placed on the sides 24 of the latch 22, the latch 22 tends to rotate so that the wall 26 moves inwardly toward the center of the ring. In so doing, it must necessarily contact the object being clamped which thereupon prevents further rotation and the possibility of the assembly becoming unlocked. The centerline of the bolt 16 is slightly above the centerline of the pintles 30 to locate the tightening nut at a point well removed from the band 10, thus facilitating the adjustment thereof. The provision of the wall 26 is instrumental in maintaining the lock in a latched position during the time the tension is applied to the bolt 16.

The possibility of distortion of the sides 24 is overcome by the channel like grooves 36 which engage the end walls 28 and lock the same against lateral movement, thus maintaining alignment when the tightening force is applied to the sides 24. By use of the grooves 36, the structure is rendered stronger and more reliable, failure of the latch 22 being eliminated.

When the band structure is to be unlocked, the nut 38 is loosened, whereupon, the tension is removed from the bolt 16 and the latch can be rotated about the pintle 30 which will release the bar 32 from the arcuate recesses 28. The bolt 16 may then be swung about the hinge joint in the loop 12 and the clamp removed from the object with which it is used. It is noted that the simplified construction of the latch 22 cooperating with the bar 32 provides a locking mechanism which is more durable and reliable and may be manufactured at less cost than previous band locks.

The band structure may also be unlocked by loosening the nut 38 which will allow the cross bar 32 to move away from the recesses 28 a sufficient distance to permit the cross bar 32 to clear the overhanging portion of the sides 24. The bolt 16 may then be swung about the hinge joint in the loop 12. The clamp may then be removed from the hose or other cylindrical object in which it is installed.

It is noted that rotation of the latch member 22 takes place when tightening the clamp around a cylindrical object. In using the clamp on resilient material such as a rubber hose, the diameter of the band changes as the clamp is tightened. The angle of the bolt 16 relative to the end portion of the band 10 will necessarily vary with the change in diameter. The rotation of the member therefore maintains the parts of the lock in uniform and proper relationship during the tightening process through the entire range of adjustability provided by the quick-release band lock.

It is to be understood that the specific nature of the present disclosure is not intended to be restrictive or confining and that various rearrangements of parts and modifications of design may be resorted to without departing from the scope or spirit of the invention as herein claimed.

I claim:

A band clamp for a band having a bolt swingably mounted on one end of the band and extending in the direction of the projected centerline of the band, a cross bar slidable on the bolt, and a latch joined to the opposite end of the band for engagement with the cross bar, said latch including a loop on the other end of the band, said loop having a slot in the central portion thereof defining a pair of spaced eyelets, pins in said eyelets, a channel member having openings in the center of the flange portions thereof engaged respectively with said pins, arcuate recesses formed on one end of each of said flanges for receiving said cross bar, annular grooves formed adjacent each end of said bar in aligned relation with said arcuate recesses to restrain distortion of the channel member when the grooves in the cross bar are engaged therewith, the central portion of the body of said bolt being disposed within the slot in the clamp supporting end of the band and between said pins when the band clamp is locked.

JAMES J. SKELLY.

References Cited in the file of this patent

UNITED STATES PATENTS

| Number | Name | Date |
|---|---|---|
| 1,804,358 | Lyons et al. | May 5, 1931 |
| 2,368,929 | King | Feb. 6, 1945 |
| 2,489,535 | Montague | Nov. 29, 1949 |

FOREIGN PATENTS

| Number | Country | Date |
|---|---|---|
| 793,074 | France | Nov. 17, 1935 |
| 144,580 | Austria | Feb. 10, 1936 |